United States Patent [19]

Vinal

[11] Patent Number: 4,782,415
[45] Date of Patent: Nov. 1, 1988

[54] DIFFERENTIAL TWIN TRACK VERTICAL READ/WRITE MAGNETIC HEAD STRUCTURE

[75] Inventor: Albert W. Vinal, Cary, N.C.

[73] Assignee: International Business Machines Corp., Armonk, N.Y.

[21] Appl. No.: 782,660

[22] Filed: Oct. 2, 1985

[51] Int. Cl.$^4$ ............................................... G11B 5/30
[52] U.S. Cl. ..................................... 360/113; 360/123
[58] Field of Search ........................ 360/113, 110–112, 360/123, 125–126, 122; 338/32 R; 324/252

[56] References Cited

U.S. PATENT DOCUMENTS

| | | | |
|---|---|---|---|
| 4,100,583 | 7/1978 | Koel et al. | 360/113 |
| 4,484,238 | 11/1984 | Vinal | 360/40 |
| 4,485,419 | 11/1984 | Vinal | 360/125 |
| 4,626,946 | 12/1986 | Vinal | 360/113 |
| 4,673,998 | 6/1987 | Souda et al. | 360/113 |

FOREIGN PATENT DOCUMENTS 0081240 6/1983 European Pat. Off. .
3014469 10/1981 Fed. Rep. of Germany .

OTHER PUBLICATIONS

McCormick et al., "Magnetoresistive Element", IBM T.D.B, Jan. 1976, vol. 18, No. 8, pp. 2431–2432.

Primary Examiner—John H. Wolff
Assistant Examiner—David J. Severin
Attorney, Agent, or Firm—Edward H. Duffield

[57] ABSTRACT

An improved twin track read/write head structure that is differential in its response, thereby eliminating common mode noise signals is described. It also has a low electrical offset, increased linearity and reduction or elimination of any bias fields interfering with the magnetic recording medium. The structure utilizes a dual coupled film magneto resistive sensor bridging the legs of two magnetically permeable coupling members so that the dual magnetic sensors are in a series magnetic circuit with the coupling members. The dual coupled film magnetic sensors are connected together in a center tapped arrangement and are oppositely magnetically biased. Opposing voltages changes occur when the pair are subjected to a magnetic flux field passing serially through them. This produces a differential output signal that rejects unwanted common mode noise of all types. In addition, during read back when the sensors are biased by a magnetic flux field into their sensitive range, the balanced differential structure of the head presents equal magneto motive forces at both ends of the sensor where they connect to the flux coupling legs. As a consequence, there is no net flux available at the other ends of the coupling legs and no flux is coupled to the media.

6 Claims, 2 Drawing Sheets

DIFFERENTIAL TWIN TRACK VERTICAL READ/WRITE MAGNETIC HEAD STRUCTURE

RELATED APPLICATIONS

This application is related to my own commonly assigned co-pending application Ser. No. 584,364, filed Feb. 28, 1984, now U.S. Pat. No. 4,626,946 and to my U.S. Pat. No. 4,484,238, issued Nov. 20, 1984. It is also related to another co-pending, commonly assigned patent application Ser. No. 782,661, now U.S. Pat. No. 4,698,711 which deals with an improved form of my own prior twin track read/write head structure as detailed in the aforementioned co-pending Ser. No. 584,364.

FIELD OF THE INVENTION

This invention relates generally to magnetic recording and playback systems and specifically to dual track read/write methods and head structures.

OBJECTS OF THE INVENTION

It is an object of this invention to provide an improved twin track magnetic read/write head structure producing a differential output signal.

Yet another object of the invention is to provide an improved bidirectionally sensitive magnetic read head that minimizes noise components in its output signal.

Yet another object of the invention is to provide an improved twin track read/write head design that eliminates magnetic bias flux coupling to the recording medium.

BRIEF DESCRIPTION OF THE DRAWINGS

These and yet other unenumerated objects of the invention are met as will now be described with reference to a preferred embodiment of a new read/write head apparatus further illustrated, and depicted in the drawings in which.

SUMMARY

The new twin track read/write head structure is differential in that the sensor provides bipolar outputs of voltages that are developed oppositely in response to input flux from a magnetic medium. The sensor is also bidirectional due to the nature of the coupled film magneto resistive sensors. The differential arrangement of two coupled film magneto resistive sensors arranged in series with a center tapped common connection is also desirable from a sensor flux biasing viewpoint. The design eliminates potentially undesirable components of flux coupling to a magnetic medium during the time that magnetic flux biasing of the coupled film magneto resistive sensors is required to place the sensors in their active range. This is true because of the center tapped differential structure that limits the magneto motive force applied to bias the sensors to an equal level at each end of the sensor pair. Since each end of the sensor pair resides on a different coupling leg of the two coupling legs that interface the magnetic medium, there is no net magneto motive force available to provide a driving flux at the medium interface. In addition, the differential design enhances the linearity of the electrical signal produced by the media and head field coupling characteristics and provides a means of rejecting unwanted common mode noise of all types.

DETAILED SPECIFICATION

Figure 1:
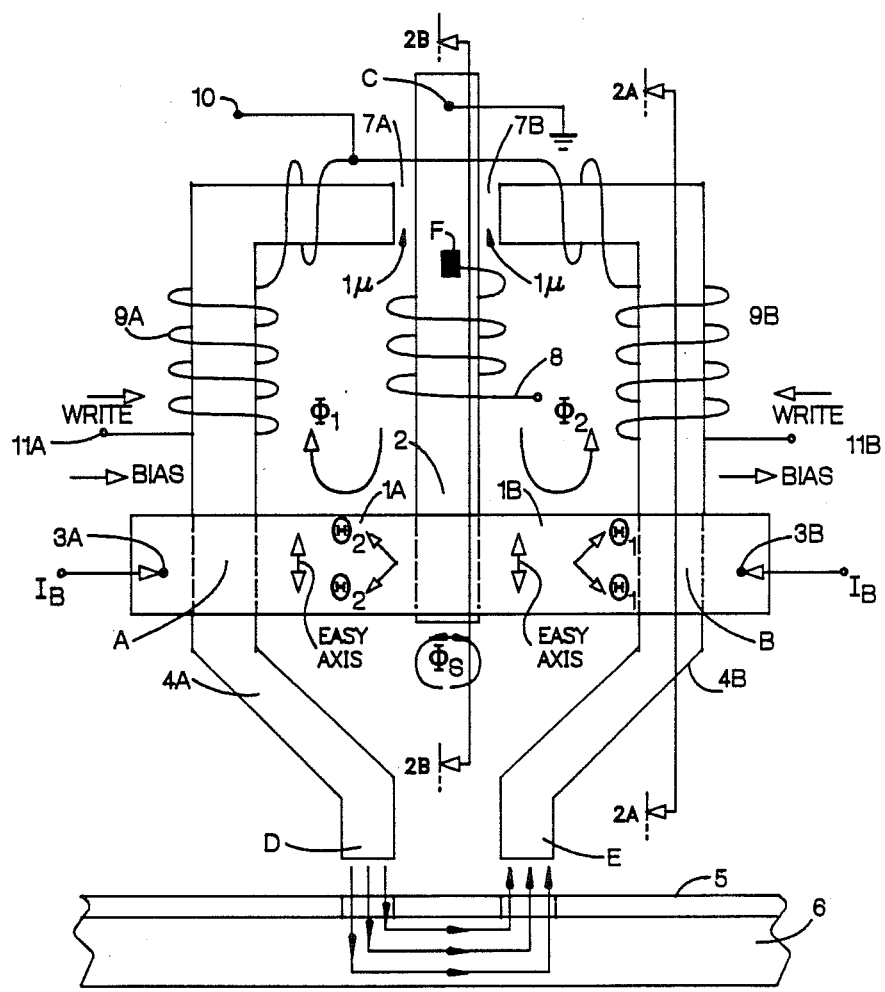
FIG. 1 illustrates a schematic plan view of the layout of the improved differential bidirectional twin track read/write head structure of the present invention.

Turning to FIG. 1, a plan view of a coupled film magneto resistive sensor pair 1A and 1B is schematically shown. It should be understood that integrated circuit manufacturing techniques and structures are envisioned for the present invention and that the elements as shown in FIG. 1 are to be laid out on the top surface of a semiconductor or ceramic substrate. Such a substrate is not shown in the figures for ease of illustration but will be pointed out where appropriate. The sensor pair 1A and 1B are joined at a common center tap that is in electrical and magnetic contact with the sensors 1A and 1B. The center tap is number 2 in FIG. 1. The opposite end of each sensor 1A and 1B is supplied with a small drive current through contacts 3A and 3B to create an anti-parallel magnetic couple within the coupled film pair. Only the upper magnetic film is shown in FIG. 1, but the magnetic sensors actually consist of a sandwich of two magnetic films with an interleaved titanium layer that magnetically isolates exchange coupling between the two sensor film layers. The film layers join along the edge near the top and bottom edge as shown in FIG. 1 and will be described in somewhat more detail later.

The individual sensors 1A and 1B are also in magnetic contact but electrically isolated from contact with the magnetic coupling legs 4 in the regions identified by the letters A and B in the drawing of FIG. 1. Coupling legs 4 are electrically isolated from the substrate by a layer of silicon dioxide or the like and are similarly electrically insulated from contact with the magnetic sensors 1A and 1B by a top layer of silicon dioxide over the legs 4. The legs 4 would be made of permalloy or cintered high permeability material known as sendust. The legs preferably have a relative permeability of approximately 2000 where air is the standard and has a permeability of 1. Each of these legs 4 is approximately 4000 Angstroms thick in the dimension in and out of the plane of the drawing paper and would be about 3 micrometers in width as measured horizontally in FIG. 1. The lower ends of the magnetic coupling legs 4 interface a magnetic medium 5 having a keeper layer 6. Vertically coupled flux components from the legs 4 through the regions designated by D and E occur to magnetically write the medium 5 in the vertical polarization mode with coupling through the keeper layer 6 to cancel out image pole pairs. The opposite ends of the legs 4 are also electrically isolated from the substrate and are also arranged to form an air gap 7A and 7B in two equal portions as shown on either side of the central magnetic and electrically conductive center tap leg 2. The center tap leg 2 is made of the same material as legs 4 but will have an upper layer of gold applied to it to provide good electrical contact with the sensor pair 1A and 1B. The gold layer is electrically grounded at point C as illustrated in FIG. 1 and may also have a bias coil 8 electrically isolated in the winding area but attached at point F to the gold upper layer of the center leg 2.

The purpose of coil 8 will be described in greater detail later.

Individual writing and/or bias coils for reading are depicted as coils 9A and 9B which are oppositely wound and commonly joined at point 10. The coils may be individually supplied with writing current at contacts 11A and 11B or, during read back, a relatively low DC current may be applied in either direction from contact 11A to 11B or vice versa to provide a magnetic flux to bias the sensors 1A and 1B into their active region of operation by magnetic flux coupling through the interface with the legs 4 in the regions A and B in FIG. 1.

The coupled film magneto resistive sensor pair is the horizontal member depicted as 1A–1B in FIG. 1. The sensor pair comprises two individual magneto resistive sensor film couple pairs for each half 1A and 1B. Vertically oriented flux coupling legs 4 interface magnetically in a close coupling arrangement to the sensors 1A and 1B in the regions A and B as shown. The purpose of the coupling legs 4 is to couple bipolar flux changes from the twin tracks recorded in the magnetic medium 5. The flux is to be coupled to the sensors 1A and 1B during reading of data and from the drive coils for writing 9A and 9B during a writing operation. The central magnetic leg 2 is, as previously noted, in both electrical and magnetic contact with the sensor pairs 1A and 1B at their center point. This leg also bisects the rear air gap to form two separate air gaps 7A and 7B as shown in FIG. 1. The individual air gaps represent a single magnetic reluctance in the back leg or back gap of dual leg structure comprising the two legs 4. The back gaps 7A–7B regulate the amount of flux that may be coupled to the sensor pair 1A and 1B from the medium 5 and also regulate the reluctance of the magnetic path that is used during the writing of data. The gap is typically 1 micron in width as shown in FIG. 1 and is selected to provide a reluctance which is greater than the reluctance through the magnetic sensor pair during read back. During the writing of data, the reluctance of the path and gaps 7A and 7B is chosen sufficiently large so it would be higher than the reluctance in the gap between the magnetic coupling legs 4 and the medium 5 so that an approximately constant level of flux may be available with a given magneto motive force for writing, relatively independant of head to medium flying height.

Figure 2A:
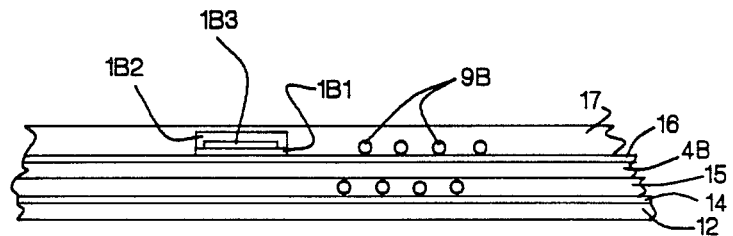
FIG. 2A illustrates a horizontal sectional elevation taken along line 2A—2A through one of the coupling legs in FIG. 1.
Figure 2B:
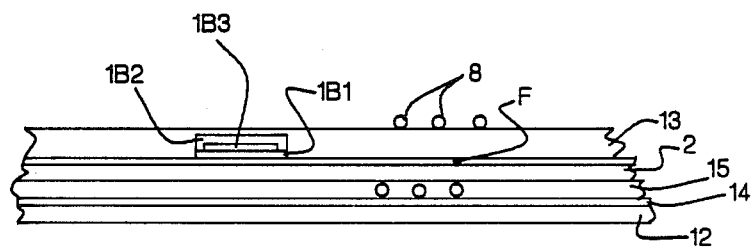
FIG. 2B illustrates a horizontal elevation sectional view taken along line 2B—2B through the center leg of the structure as shown in FIG. 1.

Turning to FIGS. 2A and 2B, the horizontal cross sectional views through the structure as shown in FIG. 1 will be described. In FIG. 2A, the horizontal cross sectional view is taken through one of the coupling legs 4B and through the sensor 1B and the writing and/or bias coil 9B. It may be seen that the semiconductor substrate 12 has deposited on it an insulative layer of silicon dioxide glass 14 as initial steps in fabrication. Next, the lower portion of the windings of the drive coil 9B will be deposited and then insulated with an overlying layer of silicon dioxide 15. Next, the permalloy or sendust magnetically permeable leg 4B is deposited as a layer on top of layer 15 and in turn is insulated by yet another layer of silicon dioxide 16 upon which are placed the upper bars of the conductor 9B and the magneto resistive coupled film sensor 1B which comprises a lower layer 1B1 of nickel iron or nickel iron cobalt well known to those of skill in the art in constructing magneto resistive sensors. On top of this nickel iron layer is an exchange coupling isolation layer somewhat narrower than the layer of nickel iron, shown as the titanium layer 1B3. Overlying the titanium and in magnetic and electrical contact with the lower nickel iron layer 1B1 is the upper layer of nickel iron material 1B2. The pair of layers 1B1 and 1B2 form a coupled film pair utilized in the sensor and have an easy magnetic axis perpendicular to the axis which couples the sensor to the vertical legs. Preferably each of these films is approximately 300 Angstroms thick and the titanium exchange coupling prevention layer is also approximately 300 Angstroms thick.

In operation, an electrical current is passed longitudinally through the sensor as shown in FIG. 1 from 3A to 3B or vice versa. This generates the easy axis anti-parallel couple as shown in FIG. 1. To operate in it's sensitive region, the easy axis magnetic couple must be torqued or biased to an angle $\theta$ as shown in FIG. 1 by application of a magnetic flux through the sensors 1A, 1B. The bias flux may be generated either by applying a small DC current to the winding 8 in the center coupling leg 2, which is grounded through its contact at point F to the leg 2 and through the ground connection C on leg 2 or by supplying a small DC bias current to the windings 9A, 9B to provide bias flux $\phi 1$ and $\phi 2$ as shown in FIG. 1. None of this flux will be coupled to the magnetic medium 5 in FIG. 1 because the magneto motive force present at points A and B are equal in this structure.

Returning to the description of FIG. 2A, an overlying insulative layer of glass, layer 17, may then be deposited. Connections between the upper and lower parts of the winding 9B are also made at the time the upper layer 9B is installed by etching holes through the glass layers 15 and 16 to allow copper to be deposited in contact with the ends of the lower portion of the coils.

FIG. 2B is essentially constructed in the same fashion except that the iron or permalloy magnetically permeable leg 2 is deposited in place of leg 4B in FIG. 2A. This leg also has a thin layer of gold 13 applied over it to provide electrical connection to the bottom central area of the coupled film magneto resistive sensors 1A and 1B. This layer 13 is shown contacting the underside of the sensor 1B in the view shown in FIG. 2B. This leg electrically conducts the initiation current required to establish the original anti-parallel couple. It also magnetically conducts flux to generate the magnetic bias to torque the anti-parallel couple through the angle $\theta 1$ and $\theta 2$ as shown in FIG. 1 when either coil 8 or the writing coils 9A, 9B are appropriately supplied with current in a DC bias mode.

The resistance of the coupled film magneto resistive sensor 1A or 1B depends non-linearly upon the angle $\theta$ shown in FIG. 1. The angle is measured between the angle of the magnetization vector within the film and the hard axis which is the axis of current conduction, i.e., horizontal in FIG. 1. Equation 1 given below explains the relationship.

$$R = \frac{l}{A} (\rho_0 + \Delta\rho \cos^2\theta) \quad (1)$$

Differentiating Eq. 1 with respect to $\theta$ yields the expression for the differential resistance as a function of angle $\theta$ for the sensor. This is given as Eq. 2.

$$R = -2\Delta\rho \frac{l}{A} \cos\theta \sin\theta \quad (2)$$

The differential resistance will have a maximum value when $\theta$ is equal to 45 degrees. In order for the sensors 1A and 1B to respond to both polarities of possible magnetic flux fields coupled through the sensors from the twin track mediums, it is necessary to bias the magnetization vector attitude within each sensor to rest at a nominal angle of 45 degrees. For this purpose, a nominal current of about 50 milliamps is passed through a three turn bias coil 8 encompassing the central leg 2 or, in the alternative, such a current may be conducted by the writing coils 9A and 9B during the read back mode when it is necessary to bias the sensors 1A and 1B into their operative region. Equal fluxes $\phi 1$ and $\phi 2$ are produced by the bias coils to circulate around the left and right segments, respectively, of the structure as shown in FIG. 1. The effect of the bias flux is to cause the magnetization within the film layers 1B1, 1B2, in each sensor to rotate about 45 degrees from the easy axis as shown in FIG. 1. When this occurs, a flux density of about 0.7 Tesla flows in each half of the sensor and will be directed longitudinally away from the center connection with leg 2. The solid portion of the arrow in each half of the sensor in FIG. 1 illustrates the attitude of the magnetization vector within the top film while the dashed arrow in each sensor illustrates the direction of the magnetization vector within the lower film in each film pair couple. There are no net demagnetizing fields directed along the easy magnetic axis in this anti-parallel alignment of magnetization within the coupled film MR layers. This is important since Barkhausen noise components may be totally eliminated by preventing the formation of 180 degree boundary walls within the layers. The complete flux coupling of the layers along their edges, as shown in cross section in FIGS. 2A or 2B to better effect, eliminates entirely any image poles forming along the edges of the sensor pair couples.

During the reading operation, the bias flux must be generated either by coil 8 or by appropriate energization of coils 9A and 9B as just discussed. The magneto motive force available at points A and B in FIG. 1 will have the same magnitude and polarity relative to the center of the sensor at leg 2. Therefore, no net bias field component will be coupled to the medium when the sensor elements are biased for reading. This is desirable since any bias field components coupled to the recording medium during read back may cause interference with data to be read therefrom.

During the data reading mode, a constant sensor current is also applied to each end of the coupled film magneto resistive sensor pair through contacts 3A and 3B and is conducted to ground through the central leg member 2 through the gold layer 13. This current creates the anti-parallel field couple alluded to earlier. It is this couple that the read magnetic flux biasing field supplied by the coils 8 or 9A and 9B rotates to the 45 degree angle to bias the sensor and to its active region of operation. It will be noted that electrical potential will also be identical at each end of the sensor during its quiescent state, i.e., when either reading or writing and that equal currents, equal bias angles and ultimately equal resistance values will result so that very little electrical offset in the output voltages that may be sensed at 3A and 3B will occur.

Whenever flux is coupled from the twin data tracks in the medium 5 around the contour DABE or EBAD in FIG. 1, the sensors will experience an imbalance in the angular attitude of the magnetization vectors within each sensor pair 1A and 1B. For example, if flux from the medium 5 is coupled around the contour EBAD, the rest angle $\theta 1$ in sensor half 1B will be increased which will decrease its resistance. At the same time, the rest angle $\theta 2$ will be reduced in the sensor half 1A increasing its resistance. The constant current conducted by each half of the sensor 1A and 1B will produce a differential voltage between the terminals 3A and 3B. If flux of the same magnitude but of opposite direction is conducted around the contour DABE, a similar imbalance will also occur, producing the same voltage difference magnitude at the sensor terminals 3A and 3B, but with opposite polarity. Given the dimensions of these sensors as approximately 4 micro inches in width by 8 micro inches in length with thickness of 300 Angstrom units in each film layer as previously described, the resistance in each half of the sensors 1A and 1B will be approximately $1\frac{1}{2}$ ohms. The maximum change in resistance due to magnetic flux field coupling from the medium will be about 2% or 30 milliohms. If the sensor current is assumed to be about 15 milliamps, the maximum differential signal output will be approximately 900 micro volts.

For writing modes of operation, a multi turn magnetizing coil is provided around each of the vertical flux coupling legs 4 as shown in FIG. 1. These coils 9A and 9B are connected in series and may be center tapped as shown by the connection 10. The function of the coils 9A and 9B is to generate a sufficient flux around the path DACBE or EBCAD to generate a flux density of about 0.12 Tesla to be coupled to the vertical twin track medium 5 depending upon the direction of current conducted by the coils 9A and 9B. During the writing mode, current is not conducted by the sensor bias coil 8 and, as pointed out earlier, the bias coil 8 is optional since the coils 9A and 9B may be used for biasing the sensor during read back mode. Prior to energizing the writing coils 9A and 9B, the magnetization within the coupled film layers of the sensor 1A and 1B will have the anti-parallel orientation and rest parallel with the easy magnetic axis. As writing coil current is increased, magnetization within the sensor elements will rotate toward the hard axis and eventually will saturate. When this occurs, the longitudinal flux conducted through the sensor pairs 1A and 1B will stop increasing and the relative permeability of the overall sensor will be unity. Any further increases in writing coil current will result in significant flux coupling through the interfaces at the coupling leg tips D and E into the magnetic medium 5. The original shunting effect of the couple film sensor pair across the legs 4 accounts for a threshold of current needed before flux can be effectively coupled into the recording medium 5. When the writing current direction is changed, magnetization within each coupled film magneto resistive element will coherently rotate in the opposite saturation direction which results in a symmetric transfer of flux to the medium for each unit of write coil current above the threshold. If a six turn coil for a total winding 9A plus 9B is assumed together with a writing current of about 200 milliamps, approximately a 0.1 Tesla field will be produced in the vertical medium.

As will be apparent from this description and the differential nature of the sensors, there will be no differential electrical signal coupled to any output connected to the points 3A and 3B when the writing coil is energized. The absence of a signal during the writing mode eliminates saturation recovery time in the sensing amplifier that may be employed and may simplify the design of a self balancing amplifier. Thermal effects of the sensor resistance and shock noise are also balanced out in the differential head design since any non-differential signal components will be cancelled out.

It is evident that other sensors rather than the magneto resistive sensors may be similarly employed. For example, Hall effect devices, magnetically sensitive transistors or diodes may each be placed in the position occupied by the present magneto resistive sensors or in their magnetic equivalent within the flux path in the circuits of the read/write head without departing from the basic spirit and scope of this invention. Therefore what is described in the following claims is intended not by way of limitation but of description only.

What is claimed is:

1. A differentially sensitive twin track magnetic read/write head structure having two physically separate magnetically permeable flux coupling members arranged in a magnetic circuit to conduct flux to or from a magnetic medium and further comprising:
    a serially connected pair of magnetic sensors spanning said two physically separate flux coupling members and magnetically coupled thereto, said sensors sharing a common central electrical and magnetic connection; and
    a third magnetically permeable electrically conductive member in magnetic and electrical connection with said central connection.

2. Apparatus as described in claim 1, further comprising:
    a pair of oppositely wound electrically conductive coils, each said coil being wrapped around one of said flux coupling members; and
    a first end of one of said coils being connected to a second end of the other of said coils.

3. Apparatus as described in claim 1, further comprising:
    an electrically conductive coil wrapped about said third magnetically permeable member.

4. Apparatus as described in claims 1 or 2 or 3, wherein:
    said magnetic sensors are each coupled film magneto resistive devices; and
    one end of each said sensor is connected to the other said sensor; and
    the other end of each said sensor is magnetically coupled to one of said flux coupling members and is provided with electrical contacts for supplying electrical current to said sensors.

5. Apparatus as described in claims 1 or 2 or 3, wherein:
    said magnetically permeable flux coupling members have proximate and distal ends;
    the proximate ends thereof forming a reluctance gap through which said third magnetically permeable member passes;
    said distal ends forming a reluctance gap and being arranged for confrontation with a magnetic recording medium.

6. Apparatus as described in claims 1 or 2 or 3, wherein:
    said magnetic sensors have an easy and a hard axis of magnetization, respectively; and
    each said sensor is arranged with its said hard axis parallel with the direction of flux conduction through said sensor.

* * * * *